United States Patent
Baudou et al.

(10) Patent No.: US 6,879,932 B2
(45) Date of Patent: Apr. 12, 2005

(54) PROCESS FOR DETERMINING THE BIOMECHANICAL COMPATIBILITY OF HEAD EQUIPMENT

(75) Inventors: Joël Baudou, St Medard en Jalles (FR); Alain Leger, Merignac (FR)

(73) Assignee: Thales, Neuilly-sur Seine (FR)

( * ) Notice: Subject to any disclaimer, the term of this patent is extended or adjusted under 35 U.S.C. 154(b) by 0 days.

(21) Appl. No.: 10/725,926

(22) Filed: Dec. 3, 2003

(65) Prior Publication Data

US 2004/0162701 A1 Aug. 19, 2004

(30) Foreign Application Priority Data

Dec. 13, 2002 (FR) .............................................. 02 15843

(51) Int. Cl.⁷ .............................................. G06F 15/00
(52) U.S. Cl. .......................................... 702/150; 2/6.1
(58) Field of Search ............................... 702/150; 2/6.1, 2/6.2, 6.3, 6.5, 422, 468; 250/206.2; 382/154

(56) References Cited

U.S. PATENT DOCUMENTS

| | | |
|---|---|---|
| 5,467,480 A | 11/1995 | Baudou et al. |
| 5,534,689 A | 7/1996 | Barbier et al. |
| 5,623,730 A | 4/1997 | Baudou et al. |
| 5,742,937 A | 4/1998 | Baudou et al. |
| 6,009,566 A * | 1/2000 | Hubbard .......................... 2/468 |
| 6,014,769 A * | 1/2000 | Baudou et al. .................. 2/6.1 |
| 2002/0129440 A1 * | 9/2002 | Hong et al. ...................... 2/422 |
| 2002/0150287 A1 * | 10/2002 | Kobayashi .................. 382/154 |

FOREIGN PATENT DOCUMENTS

| | | | |
|---|---|---|---|
| DE | 2618587 | 11/1977 | |
| DE | 19704774 | 8/1998 | |
| FR | 2750578 | 1/1998 | |
| JP | 2000245888 A * | 9/2000 | ........... A63B/71/10 |
| JP | 20002245888 | 1/2001 | |
| WO | WO 9740716 | 11/1997 | |

* cited by examiner

Primary Examiner—Michael Nghiem
Assistant Examiner—Xiuqin Sun
(74) Attorney, Agent, or Firm—Lowe Hauptman & Berner LLP

(57) ABSTRACT

The disclosure relates to the ergonomics and safety of head equipment, notably incorporating display devices, intended to be worn by aircraft crew. One of the difficulties in evaluating injury risks associated with the wearing of head equipment is to determine precisely the center of gravity of the actual user's head, since standard head models prove to be too imprecise. The invention proposes a process enabling individualized determination of the center of gravity of the user's head and therefore its precise position relative to the center of gravity of the head equipment. One preferred embodiment of said process is to establish a three-dimensional mapping of the external surface of the user's head.

19 Claims, 4 Drawing Sheets

PROCESS FOR DETERMINING THE BIOMECHANICAL COMPATIBILITY OF HEAD EQUIPMENT

BACKGROUND OF THE INVENTION

1. Field of the Invention

The invention concerns the ergonomics and safety of head equipment, notably incorporating display devices, intended to be worn by aircraft crew.

The use of so-called visionic display devices mounted directly on the user's head rather than on the instrument panel has many advantages. For example, it is possible to compensate the human vision when ambient light conditions become insufficient by means of light-intensifying night-vision devices. It is also possible to complement the user's natural vision by displaying symbols and synthetic images.

However, these devices incorporating image sources, optical components, mechanical parts, etc. have non-negligible weight and substantially increase the total load supported by the spinal column. This additional load is particularly inconvenient in that its center of gravity does not coincide with that of the head. Aircraft crews are, moreover, subject to very strong mechanical stresses (vibrations, accelerations, ejection thrust, parachute opening, crashes, etc.) which further increase the loads to which the spinal column is subjected. Moreover, the upper spinal column is known to be relative vulnerable to strong accelerations, with a risk of severe injury or even death.

The design of head-mounted visionic systems takes into account this type of risk in an effort to reduce it to an acceptable level by applying general rules and recommendations to limit the equipment mass and better position its center of gravity. FIG. 1 illustrates an example of this type of recommendation: the user's head T and the head equipment C are shown in a profile view; the head is represented by dotted outline and the helmet by a solid outline. The center of gravity $C_{GC}$ of the head equipment is represented by a black dot; the center of gravity $C_{GT}$ of the head is represented by a white dot. The white and black arrows represent the respective weights of the head and the head equipment. The recommendations notably specify that the center of gravity $C_{GC}$ must be located within a zone Z represented by the shaded rectangle whose position is specified relative to the head's center of gravity (anthropometric relationships of body and body segment moments of inertia—Air Force Aerospace Medical Research Laboratory—J. T. McConville, Ints Kaleps—J. Cuzzi—December 80).

Knowledge of the position of the head's center of gravity is therefore important for head equipment designers.

2. Description of the Prior Art

The equipment characteristics are well defined and relatively easy to calculate and measure. CAD (computer-assisted design) tools are able to calculate, on the basis of the design, the provisional weight of the helmet equipment and the position of its center of gravity. On the other hand, it is much more difficult to know precisely the mechanical characteristics of the user's head. So-called "standard" head models are traditionally used. However, these models can lead to false conclusions regarding the anatomic particularities of certain users and incorrect calculation of the head's center of gravity.

SUMMARY OF THE INVENTION

The object of the present invention is to overcome the disadvantages of using a "standard" head—whose biomechanical parameters may not correspond to those of the head of a real user—by substituting a representative digital model enabling of a more precise calculation of the exact position of the center of gravity of the head.

More specifically, the object of the invention is a process for determining the position of the center of gravity of head equipment worn by a user relative to the center of gravity of the user's head, said head equipment including display devices, characterized in that said process includes at least the following steps:

Determine the position of the head equipment's center of gravity in a first triaxial reference frame;

Determine the position of the center of gravity of the user's head by using a digital model that takes into account the anatomical data of the head, this center of gravity being determined in a second triaxial reference frame positioned relative to said first triaxial reference frame;

Determine the position of the head equipment's center of gravity in said second triaxial reference frame.

BRIEF DESCRIPTION OF THE DRAWINGS

The invention will be better understood and its other advantages will become evident on reading the detailed description below of an embodiment, which is non-limitative and taken only as an example, with reference to the attached drawings of which.

MORE DETAILED DESCRIPTION

Modern 3D anthropometric techniques are already used for personalizing the head equipment of aircraft crews. This approach avoids the need to fit head equipment with mechanical adjustment means to present the image generated by display systems to the wearer's eyes, such systems adding unnecessarily to the complexity and weight of the helmet.

One simple way of implementing the invention is to use these existing techniques to calculate the center of gravity of the user's head, in which case the basic digital model is a three-dimensional mapping of the external surface of the user's head, the anatomical data then being points on this surface.

Figure 1:
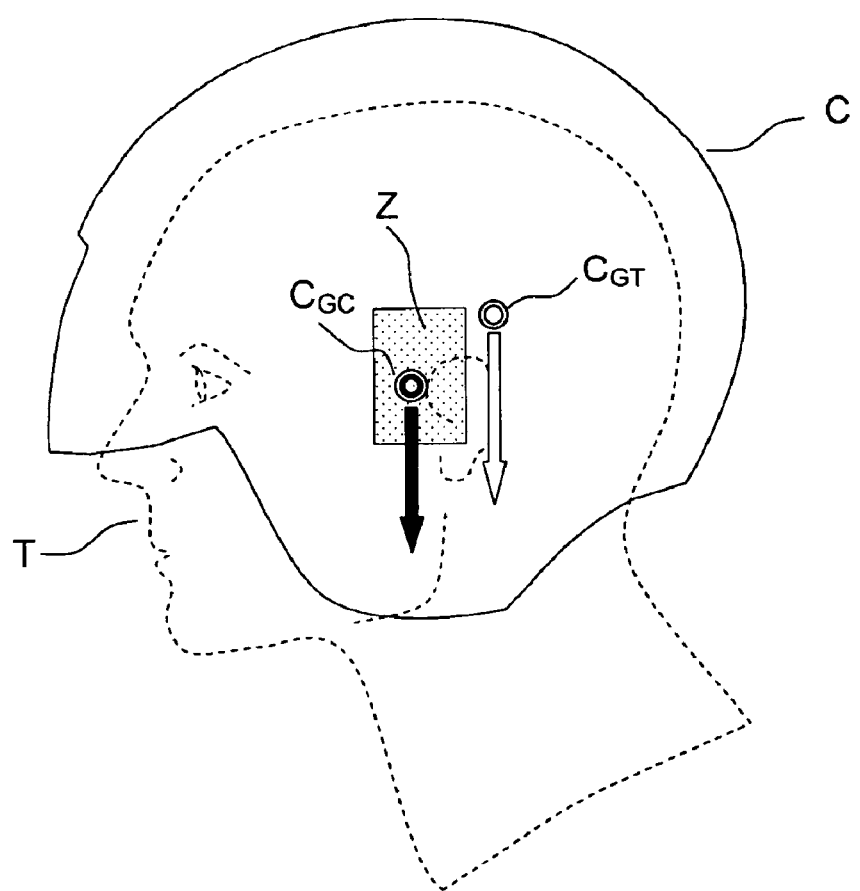
FIG. 1 shows a profile view of a user's head and head equipment.
Figure 2:
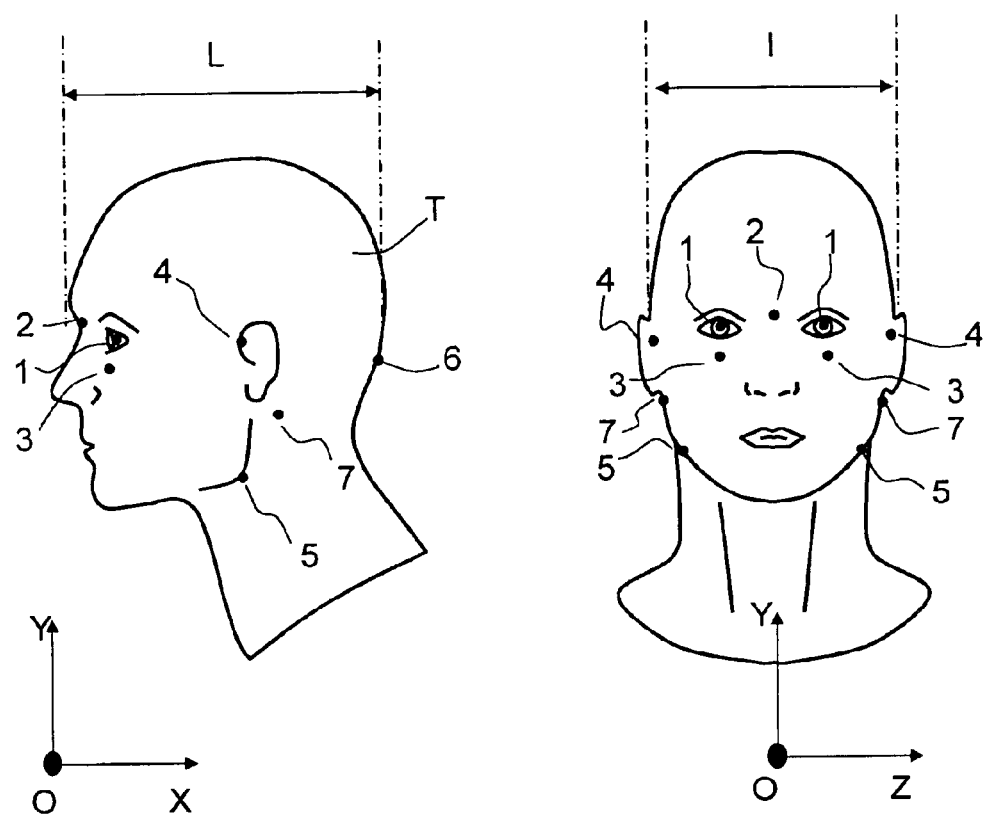
FIG. 2 shows profile and front views of a head with the positions of its characteristic anatomical points.

One of the difficult aspects of this mapping is to define a precise triaxial reference frame in which the form of the head is perfectly defined, in order to be able to calculate the centers of gravity of the head and the equipment in the same reference frame. The simplest approach is to define identifiable anthropometric points, said points enabling the head to be referenced in a second triaxial reference frame (O, X, Y, Z) whose position is defined relative to the first triaxial reference frame of the head equipment. As shown in FIG. 2, the anthropometric points are generally the right and left tragi 4 or the right and left infra-orbitals 3 or the right and left occipital condyles 7 or the nasion 2 and the centers of the right and left eye pupils 1. The pupils are particularly useful in that they constitute common references with those of the head equipment display system.

The three-dimensional mapping is traditionally performed by optical means such as optical cameras or laser-scanning optical scanners. The anthropometric points mentioned previously are identified simply by colored marks or dots affixed to the user's head. In addition to these devices, a color camera can be used to display the texture of the head surface and point to the various anatomical points of the head.

Once the three-dimensional mapping is completed, the position of the head's center of gravity $C_{GT}$ can be calculated from this mapping. The position of the center of gravity can be calculated from that of the center of volume $C_{VT}$ of the head.

Figure 3:
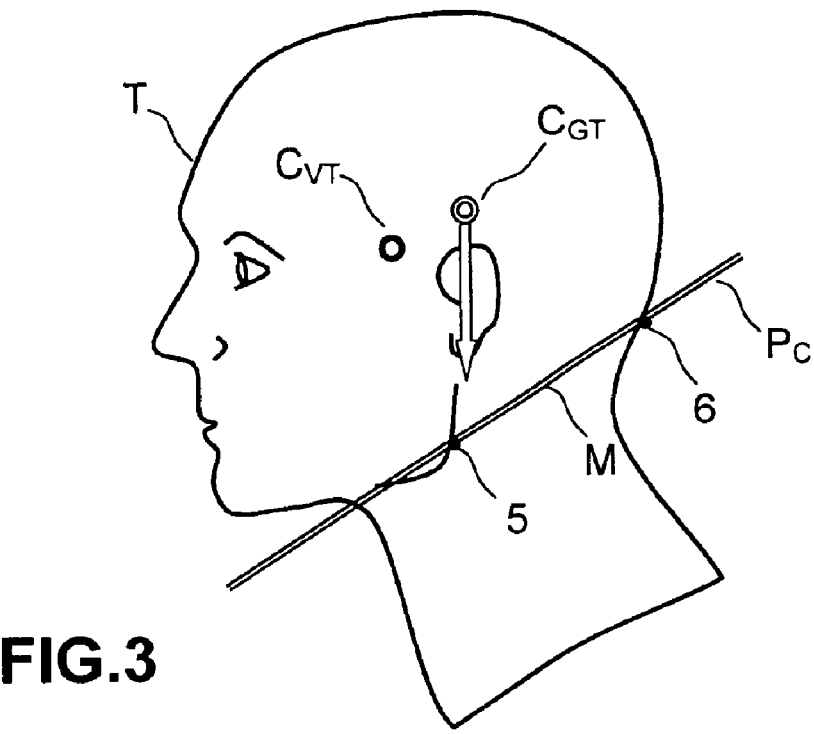
FIG. 3 shows the lower limit of the head volume delimited by a sectional plane.
Figure 4:
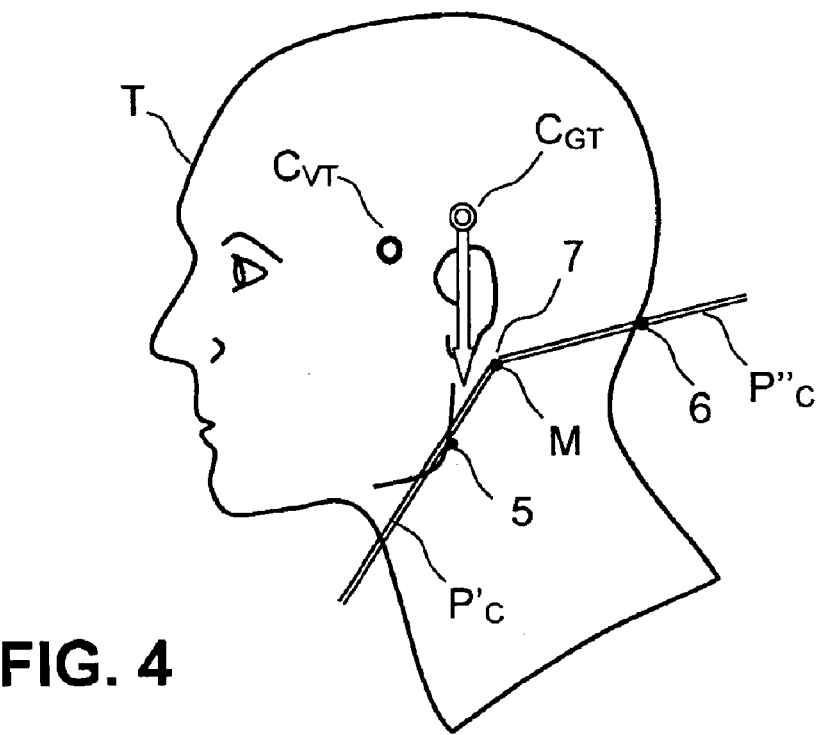
FIG. 4 shows the lower limit of the head volume delimited by two sectional planes.
Figure 5:
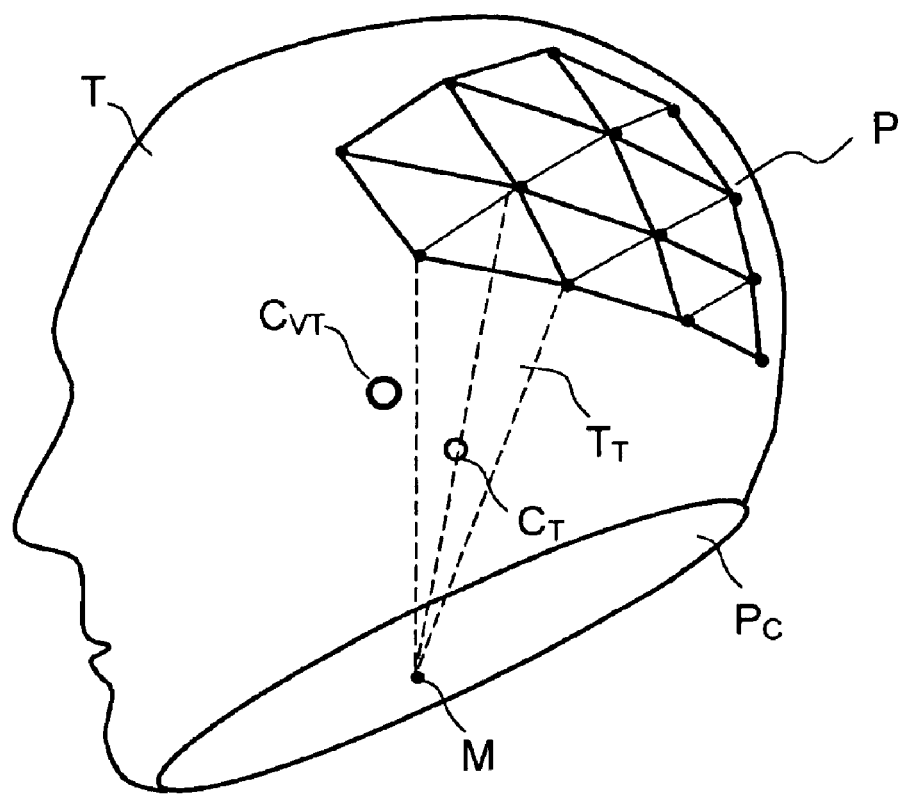
FIG. 5 represents the meshing of the head enabling its volume to be calculated.

Among the processes used to perform this calculation, it is possible to determine the position of the head's center of volume by applying a first process whose steps are illustrated in FIGS. 3, 4 and 5 and detailed below:

Select at least one sectional plane $P_C$ delimiting the head volume at neck level;

Select a common point M in this sectional plane $P_C$;

Mesh the mapping points P of the head's external surface to form adjacent triangles, the corners of each triangle coinciding with one point P;

Decompose the volume of the head into tetrahedra $T_T$ as shown in FIG. 5, each tetrahedron $T_T$ formed by the three points P of one triangle and the common point M;

Calculate the elementary volume of each tetrahedron $T_T$;

Calculate the center of volume $C_T$ of each tetrahedron;

Calculate the total volume of the head by adding the elementary volumes of all the tetrahedra;

Calculate the position of the center of volume $C_{VT}$ of the head by calculating the barycenter of the centers of volume $C_T$ of all the tetrahedra.

This first process is quite suitable when the points of the three-dimensional mapping are digitized in a standard ASCII-type format, since the calculations determining the head's center of volume are a sequence of simple elementary operations.

It is however possible to use a different process to determine the position of the head's center of volume. The steps of this second process are:

Select at least one sectional plane $P_C$ delimiting the head volume at neck level;

Create a digital object from the head mapping points and the sectional plane, said digital object being exploitable by CAD software such as EUCLID or CATIA;

Calculate the position of the center of volume $C_{VT}$ using this software.

This second process has the advantage of being able to use the head's digital model as a CAD object, which then makes it possible to perform simulations such as the positioning of head equipment on the user's head.

Whatever process is chosen, the sectional plane $P_C$ delimiting the head at neck level can be unique. It is then determined substantially by the left gonion 5, the right gonion 5 and the inion 6, as shown in FIG. 3.

The head can also be delimited at neck level by a combination of two sectional planes $P'_C$ and $P''_C$, the first sectional plane $P'_C$ delimiting the volume of the head to the front, the second sectional plane $P''_C$ delimiting its volume to the rear. The first sectional plane is defined substantially by the left and right gonions 5 and the right and left occipital condyles 7; the second sectional plane is defined by the right and left occipital condyles 7 and the inion 6. In this case, the common point M preferentially lies on the intersection of these two sectional planes $P'_C$ and $P''_C$, as shown in FIG. 4.

Knowing the position of the center of volume of the user's head, the position of the head's center of gravity can be deduced in the second triaxial reference frame of the head by using the following formula for each of the 3 coordinates $X_{CGT}$, $Y_{CGT}$ and $Z_{CGT}$ of the head's center of gravity:

$$X_{CGT} = A_X \cdot X_{CVT} + B_X \cdot L + C_X \cdot I + \ldots$$

$$Y_{CGT} = A_Y \cdot Y_{CVT} + B_Y \cdot L + C_Y \cdot I + \ldots$$

$$Z_{CGT} = A_Z \cdot Z_{CVT} + B_Z \cdot L + C_Z \cdot I + \ldots$$

where:

$X_{CVT}$, $Y_{CVT}$, $Z_{CVT}$ are the coordinates of the head's center of volume;

$A_X$, $B_X$, $C_X$, . . . are factors determined from measurements previously carried out on human heads by biomechanics laboratories and enabling a correlation to be established between the head's center of gravity and its center of volume;

L, I are respectively the length and width of the user's head, as shown in FIG. 2.

More generally, the position of each of the three coordinates of the head's center of gravity in the second triaxial reference frame is obtained by the sum of products of two factors, the first factor being a constant, the second factor being an anthropometric parameter of said head.

It is also possible to determine the head's center of gravity using a digital model that gives not only the three-dimensional mapping of the head, but also the volumetric and densitometric characteristics of its various constituents (skull bone, brain, cavities, etc.). These data are obtained, for example, using NMR (Nuclear Magnetic Resonance) tomographic imaging means.

When the volume, weight and position of the center of gravity of the user's head are known, these data can be input to bio-numerical simulation tools such as, for example, the PAM-SAFE software developed by PAM SYSTEM which can be used to create a digital model representative of each user. By applying stresses representative of real flight conditions on this digital model, the stress tensor at the head-neck interface can be computed. It is then possible to assess the risk for each user of wearing head equipment, taking account of injury criteria associated with acceptable stresses.

The result of this analysis can be exploited in several ways, for instance to:

Optimize the characteristics or position of the head equipment during its personalization in order to reduce the risks of injury.

Determine the limits of use of equipment and adapt its operational scope.

Configure the control parameters of an ejection seat or the shock absorbers in an anti-crash seat adapted to the specific characteristics of the user.

Identify users for whom the risks of injury during flight is too high.

What is claimed is:

1. A process for determining the position of the center of gravity of head equipment worn by a user relative to the center of gravity of the user's head, the head equipment including display devices, comprising following steps:

determining the position of the head equipment's center of gravity in a first triaxial reference frame;

determining the position of the center of gravity of the user's head by using a digital model that takes into account the anatomical data of the head, this center of gravity being determined in a second triaxial reference frame positioned relative to said first triaxial reference frame; and determining the position of the head equipment's center of gravity in said second triaxial reference frame.

2. The process according to claim 1, wherein the said digital model is a three-dimensional mapping of the external surface of the user's head, said anatomical data being points on said surface.

3. The process according to claim 2, wherein the said three-dimensional mapping includes identifiable anthropometric points that enable the head to be referenced in said first triaxial reference frame of said head equipment.

4. The process according to claim 3, wherein the said anthropometric points are the right and left tragi or the right and left infra-orbitals or the occipital condyles or the nasion and the pupils of the right and left eyes.

5. The process according to claim 2, wherein the means used to determine the points of said three-dimensional mapping are optical cameras or laser-scanning optical scanners.

6. The process according to claim 2, wherein the determination of the position of the center of gravity of the head is obtained by first determining the position of the center of volume of said head.

7. The process according to claim 6, wherein the said determination of the position of the center of volume of the head includes the following steps:

selecting at least one sectional plane delimiting the volume of the head at neck level;

selecting a common point in this sectional plane;

meshing the mapping points of the head's external surface to form adjacent triangles, the corners of each triangle coinciding with one point P;

decomposing the volume of the head into tetrahedra, each tetrahedron being formed by the three points of one triangle and said common point;

calculating the center of volume of each tetrahedron;

calculating the total volume of the head by adding the elementary volumes of all the tetrahedra; and calculating the position of the center of volume of the head by calculating the barycenter of the centers of volume of all the tetrahedra.

8. The process according to claim 7, wherein the said sectional plane is unique and determined substantially by the left gonion, the right gonion and the inion.

9. The process according to claim 7, wherein the head volume is substantially delimited by a combination of two sectional planes, the first sectional plane delimiting the volume of the head to the front and the second sectional plane delimiting the volume of the head to the rear, the first sectional plane being defined substantially by the left and right gonions and the right and left occipital condyles, the second sectional plane being defined by the right and left occipital condyles and the inion.

10. The process according to claim 7, wherein the position of each of the three coordinates of the center of gravity of the head in the triaxial reference frame is obtained by the sum of products of two factors, the first factor being a constant, the second factor being an anthropometric parameter of said head.

11. The process according to claim 10, wherein the said anthropometric parameter is the coordinate of the center of volume of the head on the same axis or the length of the head or the width of the head.

12. The process according to claim 6, wherein the said determination of the position of the center of volume of the head includes the following steps:

selecting at least one sectional plane delimiting the volume of the head at neck level;

creating a digital object from the points of said head mapping and said sectional plane, said digital object being exploitable by CAD software; and calculating the position of the center of volume using this CAD software.

13. The process according to claim 12, wherein the said sectional plane is unique and determined substantially by the left gonion, the right gonion and the inion.

14. The process according to claim 12, wherein the head volume is substantially delimited by a combination of two sectional planes, the first sectional plane delimiting the volume of the head to the front and the second sectional plane delimiting the volume of the head to the rear, the first sectional plane being defined substantially by the left and right gonions and the right and left occipital condyles, the second sectional plane being defined by the right and left occipital condyles and the inion.

15. The process according to claim 12, wherein the position of each of the three coordinates of the center of gravity of the head in the triaxial reference frame is obtained by the sum of products of two factors, the first factor being a constant, the second factor being an anthropometric parameter of said head.

16. The process according to claim 1, wherein the said digital model is a volumetric and densitometric model of the various constituents of the head.

17. The process according to claim 16, wherein the said digital model is established using NMR (Nuclear Magnetic Resonance) tomodensitometric imaging means.

18. A process of risk evaluation for a user wearing head equipment in operational conditions, said process comprising the process for determination of the position of the center of gravity of the head equipment relative to the center of gravity of the user's head, according to claim 1.

19. A process for execution of a digital model simulating a user wearing at least one head equipment, said process comprising the process for determination of the position of the center of gravity of the head equipment relative to the center of gravity of the user's head, according to claim 1.

* * * * *